United States Patent
Kuehlwetter

(10) Patent No.: US 10,065,670 B2
(45) Date of Patent: Sep. 4, 2018

(54) STEERING WHEEL FOR A MOTOR VEHICLE

(71) Applicant: FORD GLOBAL TECHNOLOGIES, LLC, Dearborn, MI (US)

(72) Inventor: Wolfgang Kuehlwetter, Hamm (DE)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/386,660

(22) Filed: Dec. 21, 2016

(65) Prior Publication Data

US 2017/0174248 A1 Jun. 22, 2017

(30) Foreign Application Priority Data

Dec. 22, 2015 (DE) .................... 10 2015 226 560

(51) Int. Cl.
| | | |
|---|---|---|
| B62D 1/04 | (2006.01) | |
| B62D 6/10 | (2006.01) | |
| G01L 5/22 | (2006.01) | |
| G01L 5/16 | (2006.01) | |
| B62D 1/10 | (2006.01) | |

(52) U.S. Cl.
CPC .............. *B62D 1/10* (2013.01); *B62D 6/10* (2013.01); *G01L 5/16* (2013.01); *G01L 5/221* (2013.01)

(58) Field of Classification Search
CPC .... B62D 1/10; B62D 6/08; B62D 6/10; G01L 1/08; G01L 1/12; G01L 3/02; G01L 3/10; G01L 5/16; G01L 5/221
See application file for complete search history.

(56) References Cited

U.S. PATENT DOCUMENTS

| | | | |
|---|---|---|---|
| 3,618,376 A | | 11/1971 | Shull et al. |
| 3,620,073 A | * | 11/1971 | Robbins .................. B64C 13/04 244/234 |
| 3,771,359 A | | 11/1973 | Shoberg |
| 5,593,310 A | * | 1/1997 | Kawamoto ........... B60R 16/027 439/15 |
| 6,799,481 B2 | | 10/2004 | Nieding et al. |
| 7,950,690 B2 | * | 5/2011 | Hirschfeld ............. B62D 1/043 180/422 |

FOREIGN PATENT DOCUMENTS

| | | | |
|---|---|---|---|
| DE | 9407807 U1 | * 7/1994 | ......... B60R 21/2035 |
| DE | 10114688 C1 | 3/2002 | |
| DE | 102005053181 A1 | 5/2007 | |
| DE | 102010017851 A1 | 10/2011 | |
| KR | 1019990043309 A | 6/1999 | |
| KR | 20020051771 A | 6/2002 | |

OTHER PUBLICATIONS

German Search Report dated Jun. 9, 2016 for German Application No. 102015226560.9, 5 pgs.

* cited by examiner

*Primary Examiner* — Adam D Rogers
(74) *Attorney, Agent, or Firm* — Frank A. MacKenzie; Brooks Kushman P.C.

(57) ABSTRACT

A steering wheel for a motor vehicle has an outer steering wheel rim. The outer steering wheel rim is fixedly connected, via at least one spoke, to a steering wheel pot arranged in a steering wheel center. The steering wheel pot, on the base side, has a steering wheel hub for fixing to a steering column. The steering wheel hub is configured as a load cell for detecting a load acting on the steering wheel hub. Such a steering wheel may be used to facilitate various tests.

14 Claims, 4 Drawing Sheets

STEERING WHEEL FOR A MOTOR VEHICLE

CROSS-REFERENCE TO RELATED APPLICATIONS

This application claims foreign priority benefits under 35 U.S.C. § 119(a)-(d) to DE 10 2015 226 560.9 filed Dec. 22, 2015, which is hereby incorporated by reference in its entirety.

TECHNICAL FIELD

The present disclosure concerns a steering wheel for a motor vehicle, in particular a steering wheel for use on performance of crash tests.

BACKGROUND

A conventional steering wheel for a motor vehicle generally has a steering wheel hub with which the steering wheel can be attached rotationally fixedly to a steering column end. For this, the steering wheel hub may be formed on a base of a steering wheel part, in particular may be molded integrally onto the steering wheel part. A steering wheel rim, in which a driver of the motor vehicle inputs the actual steering movements, is fixedly connected via at least one spoke to the steering wheel part arranged substantially in the center of the steering wheel.

Furthermore it is known, on a crash test of the motor vehicle, to measure the moments and forces acting on the steering column as a result of a collision of the motor vehicle with an obstacle, using suitable force sensors, for example a load cell. A load cell is a receiver that transforms a mechanical force into an electrical signal. Amongst the many different designs of load cells, configurations based on strain gauges are by far the most common.

One example of a multiaxis load cell for detection of forces and moments is described in U.S. Pat. No. 3,771,359.

A further multiaxis load cell, which may be used in a crash test of a motor vehicle in order to detect the loads acting on a steering column of the motor vehicle in a collision, is disclosed in U.S. Pat. No. 3,618,376. For this, the load cell is interposed between a steering wheel hub of a steering wheel and an end of the steering column, i.e. the steering wheel is connected via its steering wheel hub to one end of the load cell, and the end of the steering column is connected to the other end of the load cell.

Similar arrangements in which a load cell is interposed between the steering column end and the steering wheel hub of a steering wheel are also disclosed in KR 100380487 B1 and KR 1019990043309 A.

The disadvantage of the known arrangement of the load cell between the steering column end and the steering wheel hub is, for example, that the steering column geometry, in particular the steering column end point, changes due to such an interposition of the load cell. Consequently, the steering wheel protrudes further into the passenger cell of the motor vehicle than is the case without the arrangement of the load cell. Thus, the distance between the steering wheel and a person sitting in the driver's seat of the motor vehicle changes, which may have an undesirable influence on the crash test results. Also, because of its design and weight, the load cell has an influence on the dynamic penetration of the steering column in the crash test. Furthermore, in order to mount the load cell, it may be necessary to remove trim parts on the steering wheel and/or switch stalks (e.g. direction indicator and/or windscreen wiper stalks) arranged on the side of the steering wheel.

In this context, the object of the present disclosure is to provide an improved steering wheel for a motor vehicle, in particular for use in a crash test, which overcomes the above-mentioned disadvantages of the prior art.

SUMMARY

This object is achieved by a steering wheel. Further, particularly advantageous embodiments of the disclosure are disclosed.

It is pointed out that the features listed individually in the description that follows may be combined in any technically sensible manner and indicate further embodiments of the disclosure. The description characterizes and specifies the disclosure further, in particular in connection with the figures.

According to the disclosure, a steering wheel for a motor vehicle, in particular for use in a crash test, has an outer steering wheel rim, which is fixedly connected via at least one spoke to a steering wheel part arranged in a steering wheel center. The steering wheel part on the base side has a steering wheel hub for fixing the steering wheel or steering wheel part to a steering column end of the motor vehicle. According to the present disclosure, the steering wheel hub is configured as a load cell for detecting a load acting on the steering wheel hub, for example a force or forces and/or a moment or moments. In particular, with the steering wheel according to the disclosure, the load acting on the steering wheel hub in a crash test can be detected. Since the steering wheel hub according to the disclosure is configured as a load cell, the terms 'steering wheel hub' and 'load cell' are used synonymously below in relation to the present disclosure. Thus where, with reference to the present disclosure, the description below mentions a steering wheel hub, this also means the load cell forming the steering wheel hub, and vice versa.

The steering wheel according to the disclosure offers, for example, the advantage that, on use of the steering wheel according to the disclosure, in contrast to the conventional arrangement of a load cell between the steering wheel hub of a conventional steering wheel and the steering column end of the motor vehicle, the steering column geometry does not change since the dimensions of the steering wheel hub configured as a load cell do not differ, or at least do not differ substantially, from the dimensions of the steering column hub of a conventional steering wheel. Consequently, the position of the steering wheel relative to the passenger cell of the motor vehicle is not changed by the provision of the load cell, whereby more realistic crash test results may be obtained. Furthermore, the weight and form of the steering wheel hub configured as a load cell only differ slightly from the weight and form of a conventional steering wheel hub, so that the steering wheel according to the disclosure has no or only a considerably reduced influence on the dynamic penetration of the steering column in the crash test. Also, because of the compact form of the steering wheel hub configured as a load cell in the steering wheel according to the disclosure, it is no longer necessary to remove trim parts of the steering wheel and/or switch stalks arranged at the side of the steering wheel when the steering wheel is used in a crash test. Overall, therefore, the crash test conditions are improved with regard to a considerably more precise simulation of reality when the steering wheel according to the disclosure is used.

An advantageous embodiment of the disclosure provides that, on the side facing away from the steering wheel part, the load cell has a cylindrical part with a bore for receiving the steering column end. Here, the bore in the cylindrical part of the load cell is adapted to the form of the steering column end of the motor vehicle, so that the two components fit together (preferably by form fit). Thus the load cell can easily be adapted to steering column ends of different vehicle types.

According to a further advantageous embodiment of the disclosure, on the side facing the steering wheel part, the load cell has a flange for fixing the load cell to the steering wheel part. The fixing flange allows a fixed and rigid connection between the steering wheel hub configured as a load cell and the steering wheel part, giving a realistic force transmission between the steering wheel and steering column.

According to yet another advantageous embodiment of the disclosure, the load cell is connected to the steering wheel part by form fit, in particular for example screwed. A screwed connection firstly offers a sufficiently rigid connection between the load cell and the steering wheel part, and secondly allows non-destructive installation/removal of the load cell on/from the steering wheel part. In this way, the steering wheel hub configured as a load cell can be mounted on steering wheels of different types and is particularly versatile in use. For this, the steering wheel or the steering wheel part need merely provide a means suitable for the form-fit connection between the steering wheel part and the load cell, for example a (threaded) bore, a threaded bolt, a pin or similar.

According to an alternative embodiment, the steering wheel hub configured as a load cell may also be riveted to the steering wheel part.

Yet another advantageous embodiment of the disclosure provides a material-fit connection, in particular for example welding or gluing, between the steering wheel hub configured as a load cell and steering wheel part.

According to yet another advantageous embodiment of the disclosure, the load cell is a multiaxis load cell. In other words, the load cell is able to detect forces and/or moments in more than one axis. Particularly preferably, the multiaxis load cell can detect forces in three different orthogonal axes and moments about at least two different orthogonal axes.

Further features and advantages of the disclosure arise from the description below of an exemplary embodiment of the disclosure, which should not be interpreted restrictively, and which is explained in more detail below with reference to the drawing. This drawing depicts diagrammatically:

DETAILED DESCRIPTION

Figure 1:
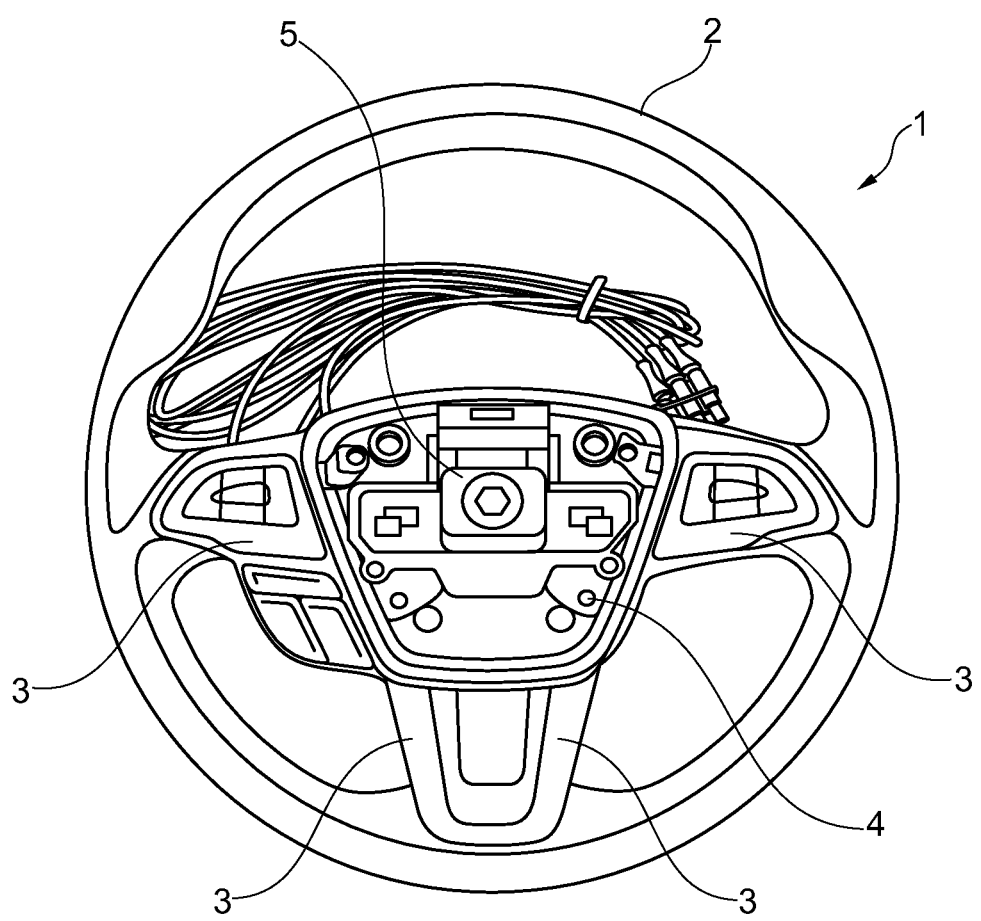
FIG. 1 a top view of a steering wheel with a steering wheel hub configured as a load cell according to an exemplary embodiment of the disclosure, FIG. 2 a perspective bottom view of the steering wheel from FIG. 1, FIG. 3 a top view of the steering wheel hub configured as a load cell, and FIG. 4 an enlarged top view of the steering wheel hub configured as a load cell from FIG. 3.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various figures, parts of equivalent function always carry the same reference numerals so these are usually only described once.

FIG. 1 shows a top view of a steering wheel 1 for a motor vehicle (not shown) according to an exemplary embodiment of the disclosure. The steering wheel 1 has an outer steering wheel rim 2 which, in the exemplary embodiment shown, is fixedly connected via four spokes 3 to a steering wheel part 4 arranged substantially in the center of the steering wheel. Approximately in the middle of the steering wheel part 3, a top side of a steering wheel hub 5 can be seen, which serves for fixing the steering wheel 1 to a steering column end (not shown) of the motor vehicle and is described in more detail below with reference to FIG. 2. The steering wheel hub 5 of the steering wheel 1 is configured as a load cell for detecting a load acting on the steering wheel hub 5, in particular forces and moments.

Figure 2:
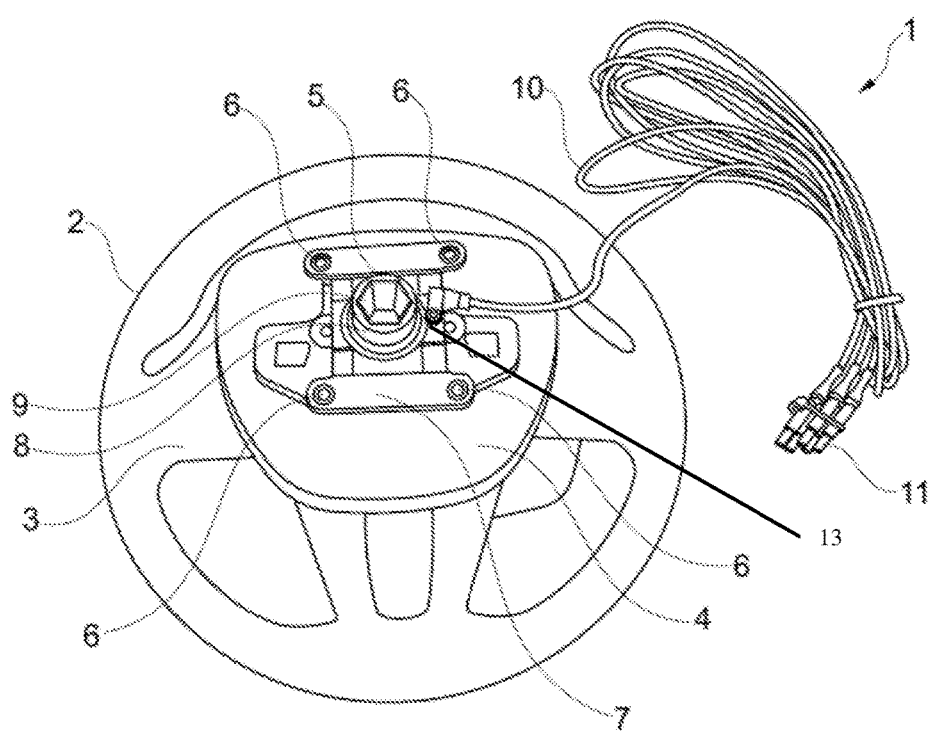

FIG. 2 shows a perspective view from below of the steering wheel 1 from FIG. 1. It is evident from FIG. 2 that on the base side, the steering wheel hub 5 is arranged on the steering wheel part 4 and is connected thereto. In particular, in the exemplary embodiment of the steering wheel 1 shown, the steering wheel hub 5 is screwed to the base of the steering wheel part 4 via a total of four screws 6. For this, on the side facing the steering wheel part 4, the steering wheel hub 5 or the load cell 13 has a flange 7 via which the steering wheel hub 5 is screwed to the base of the steering wheel part 4.

It is also evident from FIG. 2 that, on the side facing away from the base of the steering wheel part 4, the steering wheel hub 5 or the load cell 13 has a cylindrical part 8 with a bore 9 for receiving the steering column end (in the exemplary embodiment shown, by form fit). For this, the bore 9 has a hexagonal inner face.

FIG. 2 furthermore shows an electric measuring cable 10 with a total of five measurement connections 11 in the exemplary embodiment of the steering wheel 1 shown. The cable 10 serves for electrical transmission of the mechanical forces or moments received by the load cell 13 or the steering wheel hub 5, and is accordingly connected electrically to the load cell 13 or steering wheel hub 5. In the exemplary embodiment of the steering wheel 1 shown in FIG. 2, the load cell 13 is a multiaxis load cell, which is configured to detect mechanical forces in a total of three different orthogonal axes and mechanical moments about two different orthogonal axes.

Figure 3:
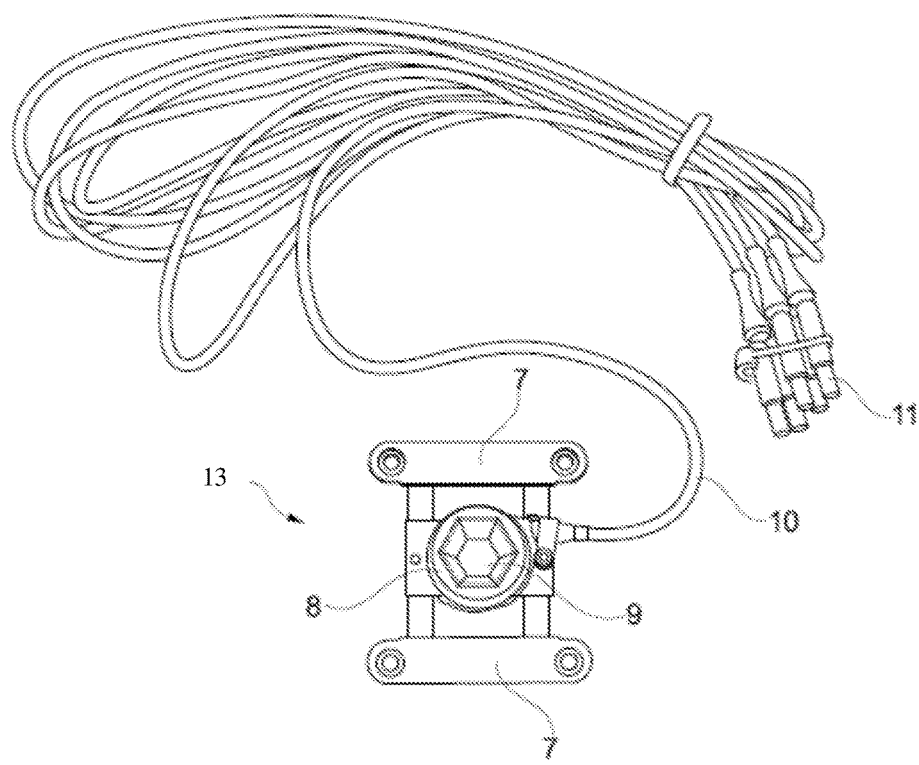
Figure 4:
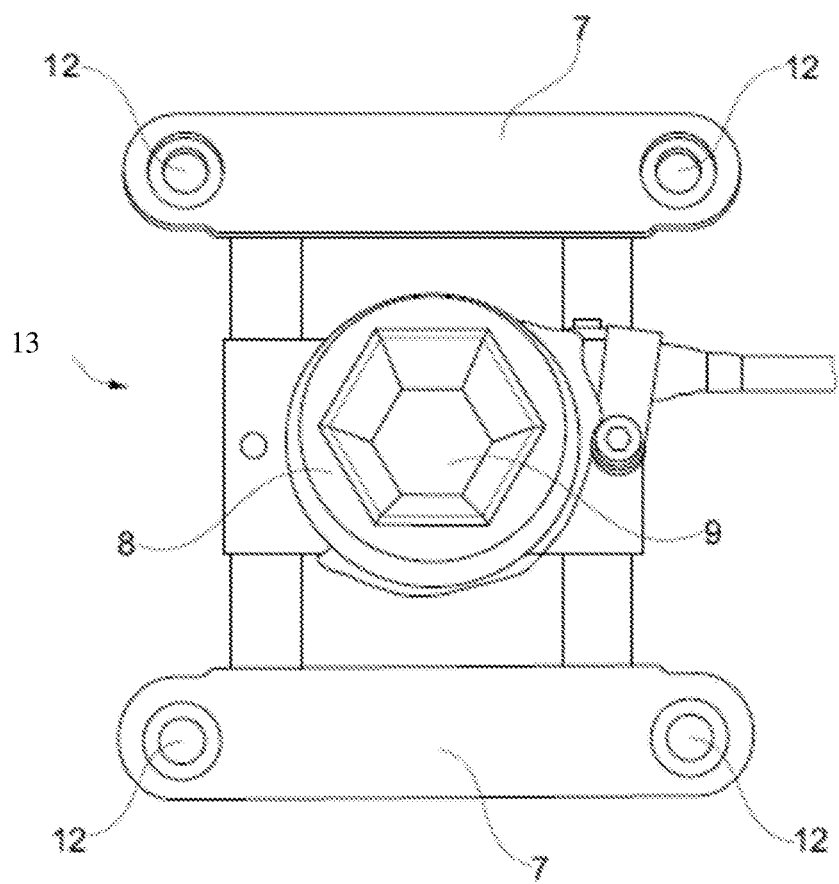

FIG. 3 shows a top view of the steering wheel hub 5 configured as a load cell in the state removed from the steering wheel 1, and FIG. 4 shows an enlarged top view of the steering wheel hub 5 or the load cell 13 from FIG. 3. A total of four bores 12 are made in the fixing flange 7 for attaching the steering wheel hub 5 or load cell 13, in the manner described above, to the steering wheel pot 4 by form fit, in particular by screwing.

The steering wheel according to the disclosure described above is not restricted to the embodiment disclosed herein but also comprises further embodiments with similar action.

In a preferred embodiment, the steering wheel according to the disclosure is used in a motor vehicle in the performance of crash tests.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A steering wheel for a vehicle comprising:
an outer steering wheel rim fixedly connected, via at least one spoke, to a steering wheel part arranged in a steering wheel center, the steering wheel part having a steering wheel hub on a base side, wherein the steering wheel hub is configured as a load cell to detect a load acting on the steering wheel hub and on a side facing the steering wheel part, the load cell has a flange configured to fix the load cell to the steering wheel part.

2. The steering wheel as claimed in claim 1, wherein, on a side facing away from the steering wheel part, the load cell has a cylindrical part defining a bore.

3. The steering wheel as claimed in claim 1, wherein the load cell is a multiaxis load cell.

4. The steering wheel as claimed in claim 3, wherein the multiaxis load cell is configured to detect forces in three different orthogonal axes and moments about at least two different orthogonal axes.

5. A vehicle comprising:
a steering wheel including a rim fixedly connected to a part at a center via a spoke, the part having a hub on a base side that includes a cylindrical part defining a bore having a hexagonal inner face, wherein the hub is configured as a multiaxis load cell to detect a load acting on the steering wheel hub.

6. The vehicle of claim 5 further comprising an electrical measuring cable attached to the hub and including measurement connections to transmit electrical signals of mechanical forces on the hub.

7. The vehicle of claim 5, wherein the hub is configured to detect mechanical forces in three different orthogonal axes and moments about at least two different orthogonal axes.

8. The vehicle of claim 5 further comprising a flange to maintain a rigid connection between the hub and the part.

9. The vehicle of claim 5, wherein the steering column geometry maintains a position of the steering wheel such that test results are obtained by the hub.

10. A steering wheel hub comprising:
a multiaxis load cell to detect a load acting on the steering wheel hub, wherein the load includes forces in three different orthogonal axes and moments about at least two different orthogonal axes; and
an electrical measuring cable attached to the multiaxis load cell to transmit electrical signals of the three different orthogonal axes and moments about the at least two different orthogonal axes on the multiaxis load cell.

11. The steering wheel hub of claim 10, wherein the multiaxis load cell is arranged on a steering wheel part and is connected thereto.

12. The steering wheel hub of claim 11, wherein, on a side facing away from the steering wheel part, the multiaxis load cell has a cylindrical part defining a bore.

13. The steering wheel hub of claim 12, wherein the cylindrical part defines the bore on a hexagonal face of the cylindrical part.

14. The steering wheel hub of claim 12, wherein the cylindrical part defines at least four bores configured to receive at least four screws to attach the multiaxis load cell to the steering wheel part.

* * * * *